UNITED STATES PATENT OFFICE.

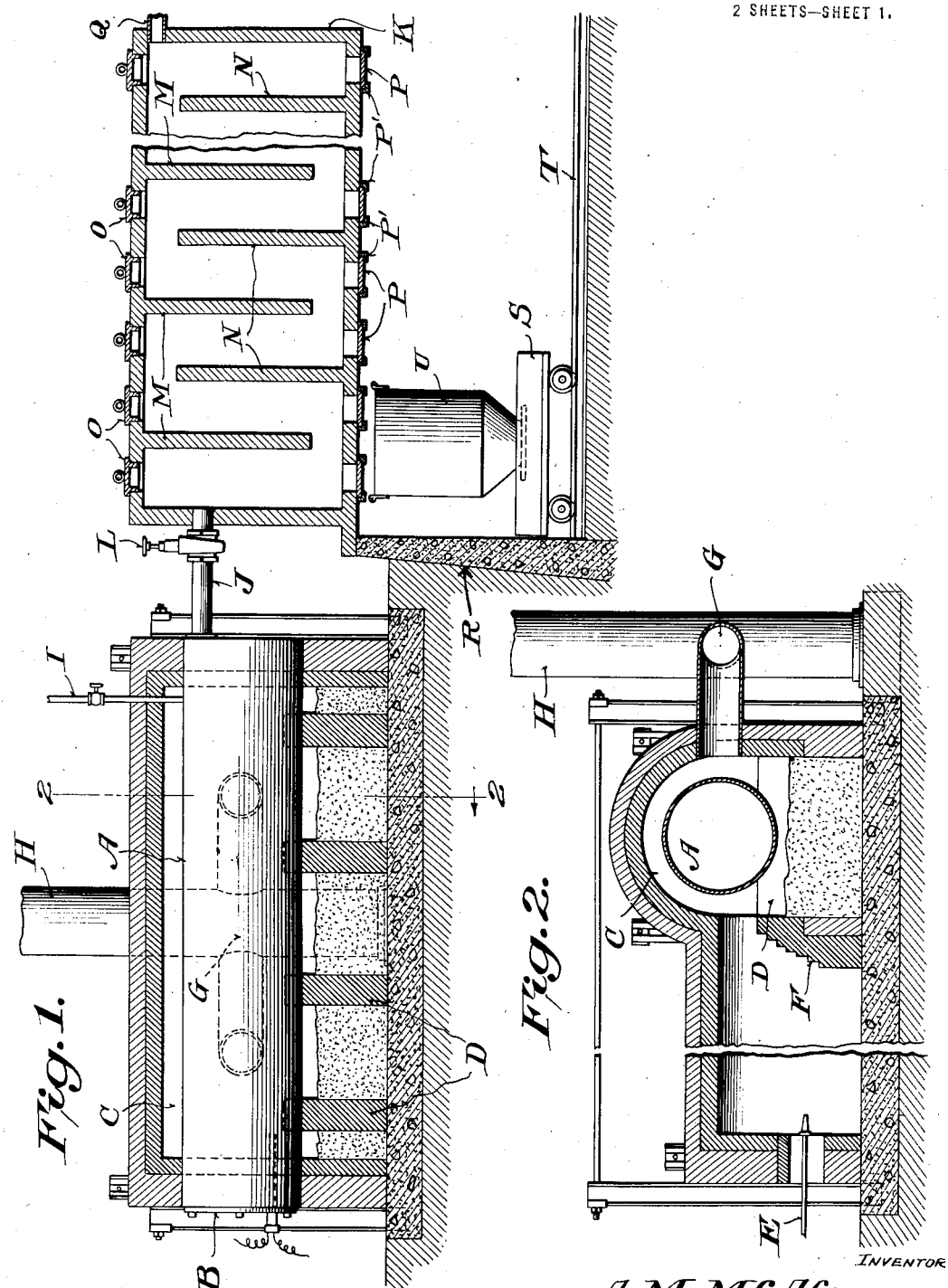

ALMER M. McAFEE, OF PORT ARTHUR, TEXAS, ASSIGNOR TO GULF REFINING COMPANY, OF PITTSBURGH, PENNSYLVANIA, A CORPORATION OF TEXAS.

MANUFACTURE OF ALUMINUM CHLORIDE.

1,405,734.   Specification of Letters Patent.   Patented Feb. 7, 1922.

Application filed March 22, 1919. Serial No. 284,347.

*To all whom it may concern:*

Be it known that I, ALMER M. MCAFEE, a citizen of the United States, residing at Port Arthur, in the county of Jefferson and State of Texas, have invented certain new and useful Improvements in the Manufacture of Aluminum Chloride, of which the following is a specification.

This invention relates to manufacture of aluminum chloride; and it comprises a method of utilizing certain oily residues which are the result of treatment of oils with aluminum chloride or with substances capable of forming aluminum chloride, such method comprising removing oil from such residues, heating the oil freed material to a high temperature—a temperature sufficient to liberate material amounts of aluminum chloride, and advantageously after the removal of such material amounts of aluminum chloride, passing chlorin or chlorin containing gas through the residue; all as more fully hereinafter set forth and as claimed.

This invention is an improvement on my process of manufacture of aluminum chloride patented June 2, 1914, No. 1,099,096. In said patent I described and claimed a method of recovering aluminum chloride from oily residues which comprises first removing oil from the residue, then heating to carbonize and then contacting chlorin or chlorin containing gas with the heated residues. Aluminum chloride, and substances capable of forming aluminum chloride, may be employed in treating various oils to produce certain changes therein; and particularly in treating mineral oils. It is known that heavy oils may be converted into lighter oils by distilling such heavy oils, for instance, crude petroleum or heavy petroleum distillates, in the presence of anhydrous aluminum chloride, by observing certain temperature controls. It is also known that a decolorizing and purifying effect may be obtained on lubricating oils and the like by warming them for a short period of time with anhydrous aluminum chloride. Utilization of aluminum chloride in the treatment of oils usually results in a residue of aluminum chloride and combined hydrocarbons. This residue or sludge is an asphaltic-like material and when carbonized is similar to refinery coke and contains very little free aluminum chloride.

Aluminum chloride per se distills or vaporizes at about 365° F. but by heating such residues as those described at that temperature they are not freed of any material amount of aluminum chloride. In fact, as stated in my Patent No. 1,099,096, the residues may be heated to the carbonization point or even to red heat without the production of any material amount of aluminum chloride.

In accordance with the present invention, after releasing or distilling off the uncombined hydrocarbons at temperatures below 800° F., I heat the residue to a temperature sufficient to decompose the aluminum chloride and hydrocarbon compounds into gases and anhydrous aluminum chloride, condensing the aluminum chloride and thus recovering it. This temperature ranges from 950° F. to about 1800° F. or above, the rapidity of decomposition depending upon the degree of heat within the range just mentioned.

I have discovered that I can obtain material quantities of aluminum chloride from the described residues by first heating them to a temperature sufficient to distil therefrom free hydrocarbon oils, which temperature may be as high as the carbonization point, and then heating such residues to temperatures above the carbonization point. The aluminum chloride residues or coky residue, as it has been termed in the art, will carbonize below 800° F. and will show red color at temperatures below 950° F. Heating such residues to the temperatures just mentioned does not produce any substantial amount of aluminum chloride; but if these residues are heated and chlorin passed through them or in contact with them, aluminum chloride is released, as described and claimed in said Patent No. 1,099,096.

I have found that treatment of the residue by heat alone in accordance with this invention results in the removal of as much as 50 per cent of the combined aluminum chloride in the residue, this calculation being based on the amount of aluminum chloride originally charged to the still in one of the oil treating processes described or on the amount of aluminum chloride in the residue being treated. I have further found that this high temperature treatment of aluminum chloride residues does not interfere with subsequent production of aluminum chloride from the residue and I therefore may pass chlorin or chlorin containing gas through such residue while heated, thus producing from the coky mass resulting from the breaking down of the hydrocarbons, material amounts of aluminum chloride, through combination of the chlorin with any remaining aluminum whether it is in the form of oxids, sulfids, or any other aluminous materials.

During the high temperature treatment, which I shall hereinafter refer to as the heat treatment, gases containing chlorin, such, for instance, as hydrochloric acid gas, are given off. I conserve the chlorin in such gases in one embodiment of my invention by adding to the aluminum chlorid residue, advantageously subsequent to the first distillation treatment to remove hydrocarbon oils, a small proportion of metallic aluminum or other aluminous materials, such as aluminum carbid or aluminum sulfid. The presence of this metallic aluminum or other aluminum compound supplies sufficient aluminum to combine with the chlorin containing gas, such as hydrochloric acid which is given off in the heat treatment, and thus permits me to increase to a considerable extent the percentage of aluminum chloride recovered from the residue by the high heat treatment. I can recover as high as 72 per cent of aluminum chloride from the coky residue by adding to such residue before or after the oils have been distilled therefrom 2 or 3 per cent of metallic aluminum or an equivalent amount of aluminous material, such as aluminum carbid or aluminum sulfid, or by passing the aluminum chloride vapors containing some formed HCl over these materials.

According to certain specific embodiments of my invention I take a ton of aluminum chloride residue as it comes from the still which has been used for carrying out the process of my copending application Serial No. 792,615, filed Sept. 30, 1913, in which a high boiling oil such, for instance, as gas oil is distilled in the presence of about 5 per cent of anhydrous aluminum chloride and maintained at boiling temperature while light oils which are formed are permitted to escape to a condenser, and aluminum chloride vaporizing being refluxed back to the still. This refluxing is accomplished by holding the exit from the still immediately in front of the water cooled condenser at a temperature of about 350° F. The said residue consists of combined aluminum chloride and hydrocarbons together with some small amounts of uncombined hydrocarbons.

The described residue is then heated, in accordance with my present invention, to a temperature sufficient to distil therefrom the uncombined hydrocarbons. Usually a temperature below 800° F. is sufficient for this purpose. I may or may not add about 3 per cent of metallic aluminum to the residue. After the free hydrocarbon oils have been distilled, I then heat to a temperature ranging between 950° F. and 1800° F. I find an average temperature of 1450° F. to be the best suited for the purpose. The result of this high temperature treatment is the freeing of substantial amounts of the aluminum chloride combined with hydrocarbons of the residue and the uniting of the metallic aluminum with any chlorin or chlorin containing gas, such as hydrochloric acid gas, which is given off (if metallic aluminum or aluminum compound has been used). The gases and vapors are passed through a condenser which collects the aluminum chloride, the gases being allowed to escape and go to waste or being recovered for use.

Then, advantageously without lowering the temperature of the charge, I pass chlorin or chlorin containing gas through the residue and I am enabled to recover substantially all the remaining combined aluminum chloride from the coky residue. In actual operation I have secured as high as 50 per cent of aluminum chloride from the heat treatment without the addition of metallic aluminum or other aluminous material, and as high as 72 per cent of aluminum chloride by the heat treatment with addition of the metallic aluminum or aluminum sulfid or aluminum carbid. And I have recovered all of the remaining aluminous material as aluminum chloride by the second step of the process wherein the chlorin or chlorin containing gas is led through the charge.

I have found in actual operation that the liberation of aluminum chloride from these residues at temperatures above the carbonization point is due to the fact that during the oil treating process to which reference has been made, the aluminum chloride forms compounds of hydrocarbons and the high temperature treatment breaks up these compounds. In any event, ordinary aluminum chloride distillation temperatures will not release the aluminum chloride from the residue and temperatures even as high as the carbonization point of the coky residue will not release any material amounts. The aluminum chloride is chemically combined with the hydrocarbons and the compound is broken up by temperatures above the carbonization point.

In the accompanying drawings I have shown two forms of apparatus capable of performing the process.

Figure 1 is a view, partially in elevation and partially in section, of one form of apparatus;

Figure 2 is a section along line 2—2 of Figure 1; and

Figure 3:
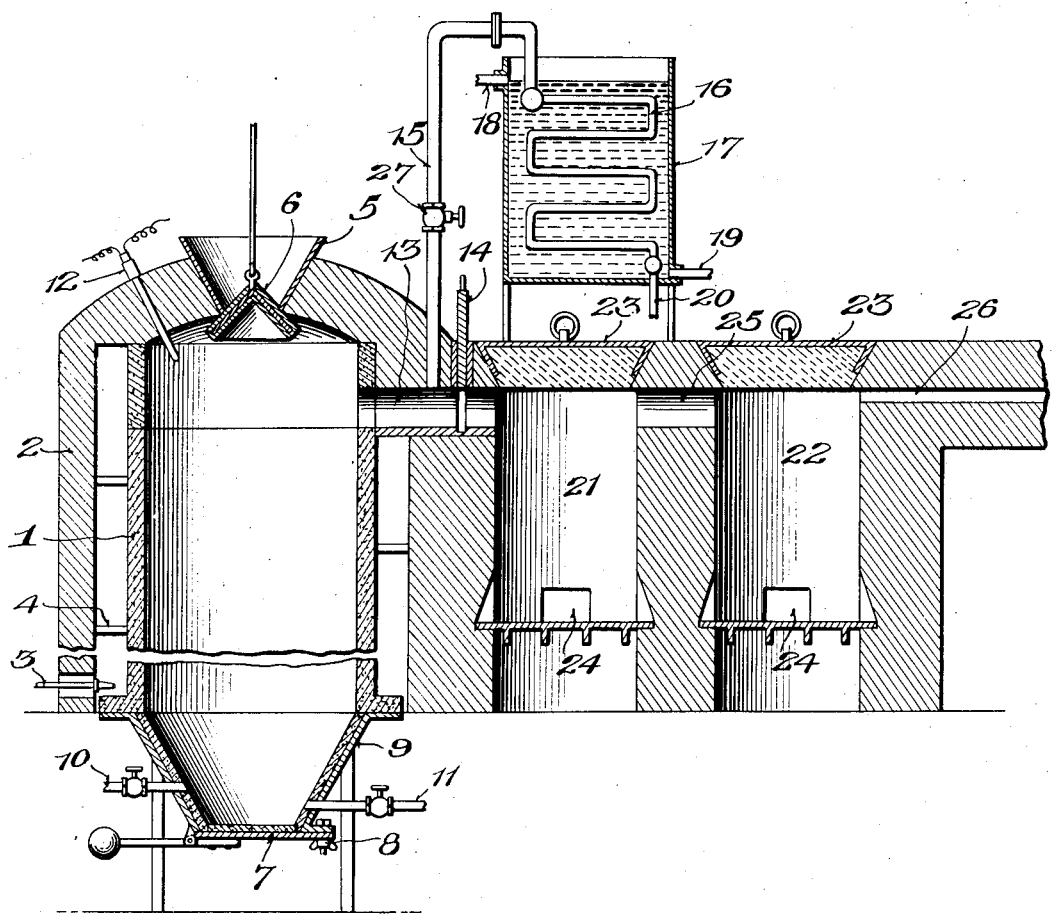
Figure 3 is a vertical section throughout another form of apparatus.

Referring to the drawings, and particularly to Figures 1 and 2, A indicates a steel retort having charging opening covered by door B and mounted in the fire chamber C, being supported by means of brick or other pillars D. The fire chamber or heating means is advantageously divided into a plurality of parts. I have shown three such chambers in order that I may control temperatures and secure uniform heating. Each of these sub-fire chambers is identical with the others and each is advantageously fired by means of the oil burner E. Located in each fire box is a baffle F designed to direct the flow of gases around the retort A without direct impingement thereon. Advantageously I provide a common flue G communicating with all the fire boxes and directing the products of combustion up the stack H. The charge of hydrocarbon-aluminum chloride residue is placed in the retort and the retort heated to the temperatures described. Preliminarily, as described, free hydrocarbons are distilled and these pass through the valved pipe I to a condenser (not shown) where they are condensed for use, the valve in the pipe I being open. When the free hydrocarbons have been distilled off, the valve in pipe I is closed.

Pipe J leads from the end of the retort to condenser K and is provided with valve L. This valve L is opened upon the closing of the valve in pipe I and then permits released aluminum chloride to pass to the condenser K.

The condenser is advantageously constructed of acid-proof material, such as high silica-content brick, and is provided interiorly with a plurality of baffles M and N, baffles M extending from the top to a point slightly above the bottom, while baffles N extend from the bottom to a point slightly below the top, thus effecting a circuitous passage of the aluminum chloride vapors therethrough and assisting in entrapping condensed aluminum chloride. The baffles, arranged as described, form in effect a plurality of chambers in which the aluminum chloride deposits. Each of these so formed chambers is provided at the top with an opening having cover O and at the bottom with an opening having cover P. Covers O are arranged to be lifted from their openings, while covers P are arranged for sliding in the tracks P', thus permitting removal of the aluminum chloride from the compartments formed by the baffles when the covers are removed. When the cover P is removed, the aluminum chloride will fall into a receptacle hereinafter described, but, since some aluminum chloride will adhere to the walls of the chamber, the cover O is removed and this aluminum chloride is scraped down by means of suitable implements.

Gases from the operation are permitted to escape through pipe Q. The condenser is mounted upon standards or supports R which may be of concrete or similar material and at a height sufficient to permit entrance of a car under the condenser. The car is indicated at S and is moved into position on tracks T so that its hopper U may be placed directly under any pair of the chambers of the condenser to receive the material therefrom.

Ordinarily, when using the apparatus above described, I do not carry out my complete process of releasing the total amount of combined aluminum chloride by means of chlorin or chlorin containing gas, but prefer to use the apparatus just described for the high heat treatment alone.

When I desire to contact chlorin or chlorin containing gas with the residue remaining after the high heat treatment, I use the apparatus of Figure 3, or I may use the apparatus of Figure 3 for the complete process, as will appear from the following description.

In the showing of Figure 3, 1 indicates a retort located in the furnace 2, such furnace being provided with heating means, such as an oil burner or the like 3, the fire chamber between the retort and the furnace walls being bridged at intervals by partition 4 to cause a circuitous passage of the hot gases around the walls of the retort. The upper wall of the retort is provided with a hopper 5 having the bell valve 6 which may be lowered to permit charging the retort. At the bottom of the retort is provided a closure 7 having weight at one end and fastenings 8 at the other end and there are also provided towards the bottom of the retort advantageously in the funnel shaped lower end 9 a pipe 10 for the admission of chlorin or hydrochloric acid gas and pipe 11 to withdraw settled oils as hereinafter described. The retort is also provided with a pyrometer 12.

Leading from the upper end of the retort is the passage 13 provided with a gate valve 14 which when closed permits the distilled products to pass through the pipe 15 to the condensing coil 16 located in the water receptacle 17. Pipes 18 and 19 permit circulation of the water through the condenser. An air-cooled condenser, however, may be used. Condensed products are removed at 20.

In communication with the passage 13 and adapted for use after the oils have been distilled from the charge in the retort is a pair of aluminum chloride collection receptacles 21 and 22. Each is provided with a removable top 23 and lower closure 24. Passage 25 from collection receptacle 21 permits flow of vapors to collection chamber 22 and passage 26 from the latter permits escape of gases, advantageously to a collection tank for subsequent use.

I deem it advantageous to construct the retort and the receptacles 21 and 22 of clayey or siliceous material and the bell and feed device of iron, steel or bronze, but such device should be protected by clay or a like covering.

The operation of the apparatus is obvious from the foregoing description. The charge of aluminous residue or coky sludge, as it is sometimes called, is placed in the retort 1 and the burner 3 is adjusted to heat the retort to a temperature sufficient to cause distillation of uncombined hydrocarbons from the residue, these oils pass through passage 13 and to the condensing coil 16 through the pipe 15, gate valve 14 being then closed. When the free hydrocarbons have been distilled from the aluminum chloride residue, gate valve 14 is opened and the burner 3 adjusted to heat the retort above the distillation point of such oils. Usually below 800° F. will remove all the free oils from the residues, while temperatures as high as 950° to 1800° F. are subsequently necessary to free the aluminum chloride from its combination with the hydrocarbons. The aluminum chloride vapors pass through passage 13 to chambers 21 and 22 and may be removed through doors 24. Waste gases pass through outlet 26.

As has been stated, I may introduce with the charge of coky residue a small percentage of aluminum, aluminum carbid, or aluminum sulfid. When the heat treatment is commenced and after the oils have been distilled from the residue the small amount of hydrochloric acid or chlorin or chlorin containing gas which may be given off will unite with the metallic aluminum or the aluminum carbid, or sulfid, forming aluminum chloride. This permits me to utilize all the chlorin in the residue when I add to the process the subsequent step which is now to be described.

I may maintain the temperature of the retort at 950° to 1800° F. which, as stated, is necessary for the recovery of material amounts of the aluminum chloride by heat alone. Subsequent to the time that the aluminum chloride has been removed by heat alone and collected I introduce chlorin or a gas containing chlorin, such, for instance, as hydrochloric acid, in the valved pipe 10 located in the conical or tapered end of the retort 1. This chlorin or chlorin containing gas passes through the charge and serves to produce aluminum chloride from the coky residue. The aluminum chloride thus produced may be collected in the receptacles 21 and 22 just as in the previous step where heat alone is used.

One important advantage resulting from the high heat treatment resides in the fact that I can recover pure anhydrous aluminum chloride. The aluminum chloride compound or residue as it comes from the iron stills or other apparatus in which aluminum chloride has been used contains material amounts of iron and iron compounds. This iron is probably in the form of ferrous compounds of hydrocarbons and on decomposition in the high heat treatment probably forms ferrous chloride which does not sublime at the temperatures used in my process. In any event, in operating my process I have been able to recover iron-free anhydrous aluminum chloride, which is particularly desirable for some purposes.

What I claim is:—

1. The process of recovering aluminum chloride from hydrocarbon residues containing the same in combination, which comprises heating such residues to a temperature sufficient to break up the compound, and condensing the aluminum chloride released.

2. The process of recovering aluminum chloride from hydrocarbon residues containing the same in combination, which comprises heating such residues to a temperature above substantially 950° F., and condensing the aluminum chloride released.

3. The process of recovering aluminum chloride from hydrocarbon residues containing the same in combination, which comprises heating such residues to a temperature betwen 950° F. and 1800° F., and condensing the aluminum chloride released.

4. The process of recovering aluminum chloride from hydrocarbon residues containing the same in combination, which comprises heating such residues to a temperature around 1450° F., and condensing the aluminum chloride released.

5. The process of recovering aluminum chloride from hydrocarbon residues containing the same in combination, which comprises heating such residues to a temperature above substantially 950° F., collecting the aluminum chloride released and then passing chlorin or chlorin containing gas through the remaining residue while heating and collecting the remaining aluminum chloride released.

6. The process of recovering aluminum chloride from hydrocarbon residues containing the same in combination, which comprises adding aluminum or aluminum compound to the residue, heating such residue to a temperature sufficient to break up the compound, and condensing the aluminum chloride released.

7. The process of recovering aluminum chloride from hydrocarbon residues containing same in combination, which comprises adding aluminum or aluminum compound to the residue, heating to a temperature between 950° F. and 1800° F., and collecting the aluminum chloride released and formed.

8. The process of recovering aluminum chloride from hydrocarbon residues containing same in combination, which comprises adding aluminum carbid to the residue, heating to a temperature between 950° F. and 1800° F., and collecting the aluminum chloride released and formed.

9. The process of recovering aluminum chloride from hydrocarbon residues containing same, which comprises heating same to drive off free hydrocarbons, then heating to a temperature above carbonization point of the residue and condensing aluminum chloride released.

10. The process of recovering aluminum chloride from hydrocarbon residues containing same, which comprises heating same to drive off free hydrocarbons, then heating to a temperature above carbonization point of the residue, condensing aluminum chloride released and then passing chlorin or chlorin containing gas through the remainder of the residue and condensing the remaining aluminum chloride released.

In testimony whereof, I affix my signature hereto.

ALMER M. McAFEE.